United States Patent [19]

Coleman, Jr.

[11] 4,140,298
[45] Feb. 20, 1979

[54] POST AND RAIL FENCE CONSTRUCTION

[75] Inventor: Jerry D. Coleman, Jr., Harvester, Mo.

[73] Assignee: The Binkley Company, Warrenton, Mo.

[21] Appl. No.: 886,668

[22] Filed: Mar. 15, 1978

[51] Int. Cl.² .............................................. E04H 17/14
[52] U.S. Cl. ..................................... 256/65; 403/263; 403/252
[58] Field of Search .................. 256/21, 22, 65, 66, 256/70, DIG. 4; 403/263, 254, 252, 242, 231, 360, 289, 344; 52/664, 284; 248/221.4, 221.3, 73

[56] References Cited

U.S. PATENT DOCUMENTS

| 1,376,150 | 4/1921 | Miller | 256/21 X |
| 2,023,814 | 12/1935 | Lindsey | 52/284 X |
| 3,095,184 | 6/1963 | Boxberger | 256/21 X |

FOREIGN PATENT DOCUMENTS

| 1060396 | 4/1954 | France | 403/231 |
| 6603194 | 4/1965 | Netherlands | 403/231 |

*Primary Examiner*—Werner H. Schroeder
*Assistant Examiner*—C. J. Arbes
*Attorney, Agent, or Firm*—Koenig, Senniger, Powers and Leavitt

[57] ABSTRACT

A post and rail fence construction comprising a tubular steel post adapted to be mounted in an upright vertical position and a steel rail generally of channel section adapted to extend generally horizontally from the post. The post has at least one hole therein for reception of one end of the rail which has a detent thereon. The rail is sufficiently resilient for springing the sides of the rail together for insertion of the rail and detent inside the post through the hole. On release, the sides of the rail spring apart into engagement with the post with the detent inside the post for locking the rail therein.

3 Claims, 3 Drawing Figures

U.S. Patent     Feb. 20, 1979     4,140,298
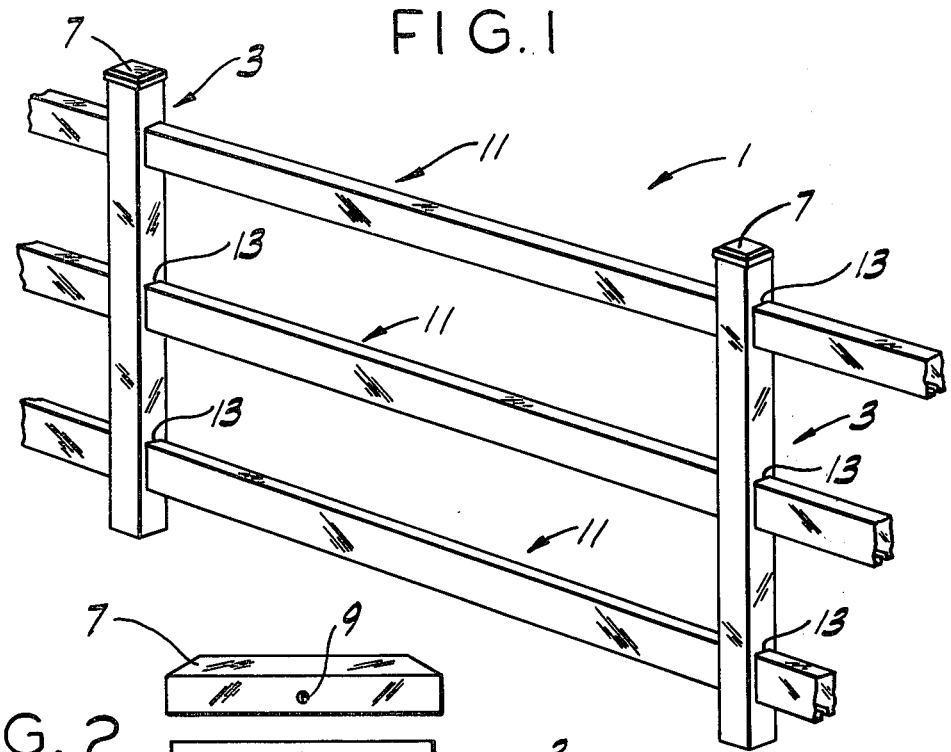
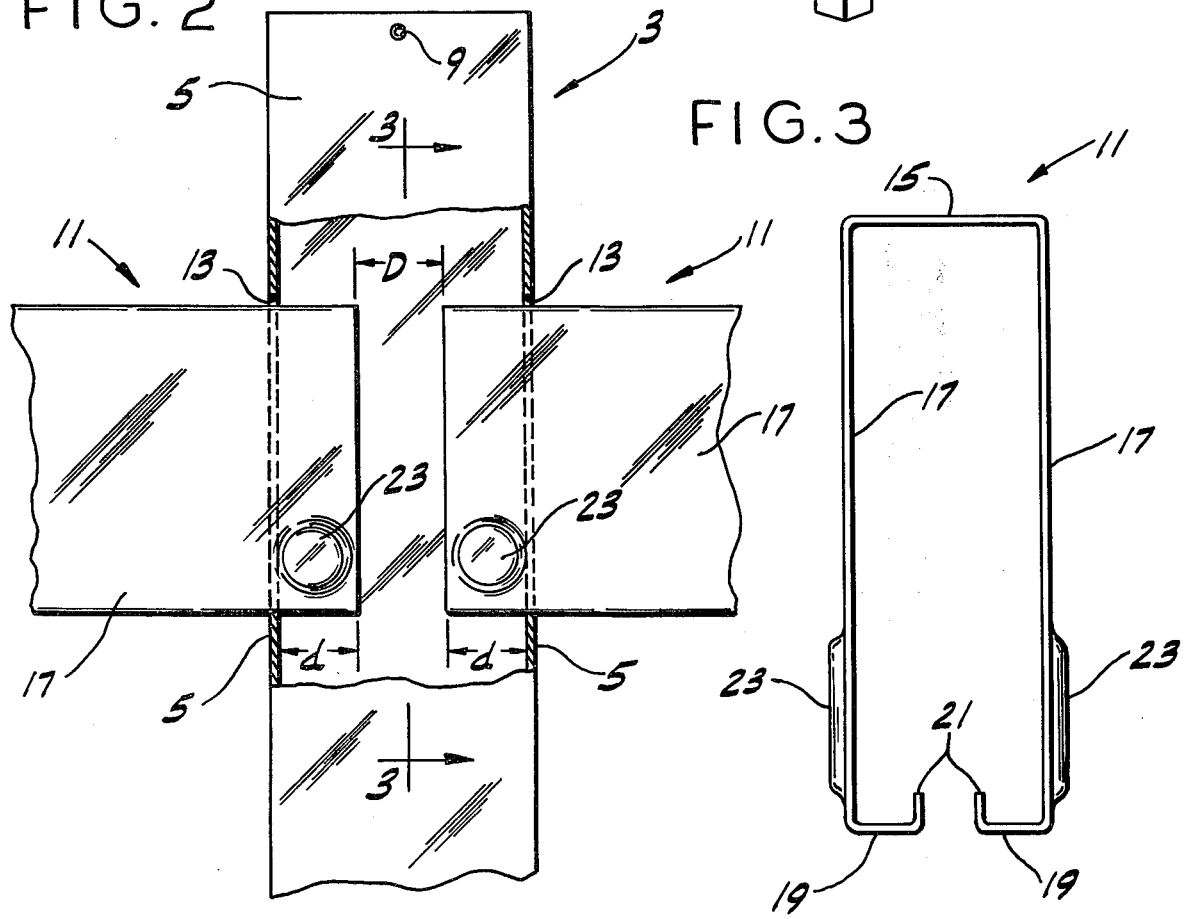

POST AND RAIL FENCE CONSTRUCTION

BACKGROUND OF THE INVENTION

This invention relates generally to a fence construction and more particularly to an improved post and rail fence construction which readily may be assembled without the use of tools. Reference may be made to U.S. Pat. Nos. 3,955,801 and 3,822,053 which disclose fence constructions of the same general type as this invention.

SUMMARY OF THE INVENTION

Among the several objects of this invention may be noted the provision of an improved post and rail fence construction which may be readily assembled without the use of tools; the provision of such a fence construction which is pleasing in appearance; and the provision of such a fence construction which is durable and simple in design for economical manufacture.

Generally, an improved post and rail fence construction of this invention comprises a tubular steel post adapted to be mounted in an upright vertical position and a steel rail adapted to extend generally horizontally from the post. The post has at least one hole therein for reception of one end of the rail, and the rail is generally of channel section, having a web and a pair of side flanges. The flanges have lips extending inwardly toward one another generally at right angles to the flanges at their edges, and the lips are spaced apart at their inner ends and have inturned margins extending generally parallel to the flanges. The flanges also have detent means thereon toward the aforesaid one end of the rail and the rail is sufficiently resilient for springing the flanges together for insertion of that end of the rail and the detent means thereon inside the post through the hole in the post with the open side of the channel facing down toward the bottom of the post. On release of the flanges, they spring apart into engagement with the post with the detent means inside the post for locking said one end of the rail therein. The inturned margins of the lips are engageable one with the other on springing the flanges together to limit their inward spring.

Other objects and features will be in part apparent and in part pointed out hereinafter.

BRIEF DESCRIPTION OF THE DRAWINGS

FIG. 1 is a perspective of a fence constructed in accordance with this invention;

FIG. 2 is an enlarged front elevation of a fragment of FIG. 1 with parts broken away and a cover for a post removed to illustrate details; and FIG. 3 is an enlarged vertical section on line 3—3 of FIG. 2.

Corresponding reference characters indicate corresponding parts throughout the several views of the drawings.

DESCRIPTION OF THE PREFERRED EMBODIMENT

Referring to the drawings, particularly to FIG. 1, a fence constructed in accordance with this invention is designated in its entirety by the reference numeral 1 and is shown to comprise a plurality of tubular posts, each generally indicated at 3, mounted at suitable intervals in an upright vertical position. These tubular posts, which are preferably of 18-gauge sheet steel, have four side walls 5 and are generally square in cross-section, although it shall be understood that other post configurations may also be suitable. Indicated at 7 at the top of each post 3 is a removable cap, with mating dimples 9 on the post and cap providing for snap fastening of the cap to the post (see FIG. 2).

Steel rails, each generally designated 11, extend in series horizontally between the posts to interconnect the latter, each post having holes 13 in two opposed side walls 5 thereof for receiving the ends of the rails 11. As best illustrated in FIGS. 2 and 3, each rail 11 is generally of channel section, having a web 15 and a pair of side flanges 17. Extending inwardly toward each other from the lower (as viewed in FIG. 3) edges of these flanges and generally at right angles thereto are two lips, each indicated at 19. These lips are spaced apart and have inturned margins 21 extending generally parallel to the flanges up toward the web 15 of the rail.

For locking opposite ends of a rail 11 inside adjacent posts 3, detent means is provided toward each end of the rail. More particularly, this detent means comprises a pair of bosses, each designated 23, toward the outer (lower) edges of the side flanges 17. As illustrated in FIG. 2, these bosses are generally circular, but it will be understood that this shape may vary without departing from the scope of this invention.

Each rail 11 is of a resilient material, such as 22-gauge sheet steel, thus allowing the side flanges 17 of the rail to be sprung (i.e., squeezed) together. And in accordance with this invention, the margins 21 of the lips 19 are engageable one with the other on springing the flanges together to limit their inward spring. Springing the flanges together allows opposite ends of the rail 11 and the bosses 23 thereon to be readily inserted inside adjacent posts 3 through respective holes 13 in the post side walls 5. In this regard, the distance D between the ends of two adjacent rails 11 inside a post 3 (see FIG. 2) should be greater than the distance $d$ each of those rails extends inside the post. This allows the flanges of the right rail 11, for example, to be squeezed together and the rail inserted through hole 13 and into the post a sufficient distance to the left for insertion of the right end of that rail into the next post. To prevent the channel-shaped rail from catching debris, water, etc., it is inserted with its open side facing down toward the bottom of the post. On release of the flanges 17 after insertion of the ends of the rail into the posts, the flanges 17 are adapted to spring apart into engagement with the post side walls 5 with the bosses 23 being inside the posts for locking the ends of the rails therein.

The rail is, of course, also readily removable from the post by reversing the steps set forth above, it being understood that the distance D between the ends of the rails is sufficient to permit the right rail 11, for example, (as shown in FIG. 2) to be moved a sufficient distance to the left for removal of the right end of that rail from the next post (by squeezing the flanges at said right end together). After removal of the right end of the rail, the left end may be removed from the post.

In view of the foregoing, it will be apparent that a fence constructed in accordance with this invention may be readily assembled and disassembled without the use of tools. Moreover, it is pleasing in appearance, durable and simple in design for economical manufacture.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A post and rail fence construction comprising a tubular steel post adapted to be mounted in an upright vertical position and a steel rail adapted to extend generally horizontally from the post, the post having at least one hole therein for reception of one end of the rail, and said rail being generally of channel section, having a web and a pair of side flanges, said flanges having lips extending inwardly toward one another generally at right angles to the flanges at their edges, said lips, at their inner ends, being spaced apart and having inturned margins extending generally parallel to the flanges, and the latter having detent means thereon toward said one end of the rail, the rail being sufficiently resilient for springing the flanges together for insertion of said one end of the rail and said detent means thereon inside the post through said hole with the open side of the channel-shaped rail facing down toward the bottom of the post whereby on release of the flanges, they spring apart into engagement with the post with the detent means inside the post for locking said one end of the rail therein, the margins of said lips being engageable one with the other on springing the flanges together to limit their inward spring.

2. A post and rail fence construction as set forth in claim 1 wherein said detent means comprises a boss on each of said side flanges.

3. A post and rail fence construction as set forth in claim 2 wherein the bosses are toward the outer edges of said side flanges.

* * * * *